Feb. 24, 1970  G. I. TSUDA  3,497,835
MICROWAVE FILTER

Filed Dec. 10, 1965  3 Sheets-Sheet 1

INVENTOR.
GEORGE I. TSUDA,
BY J. K. Haskell
ATTORNEY.

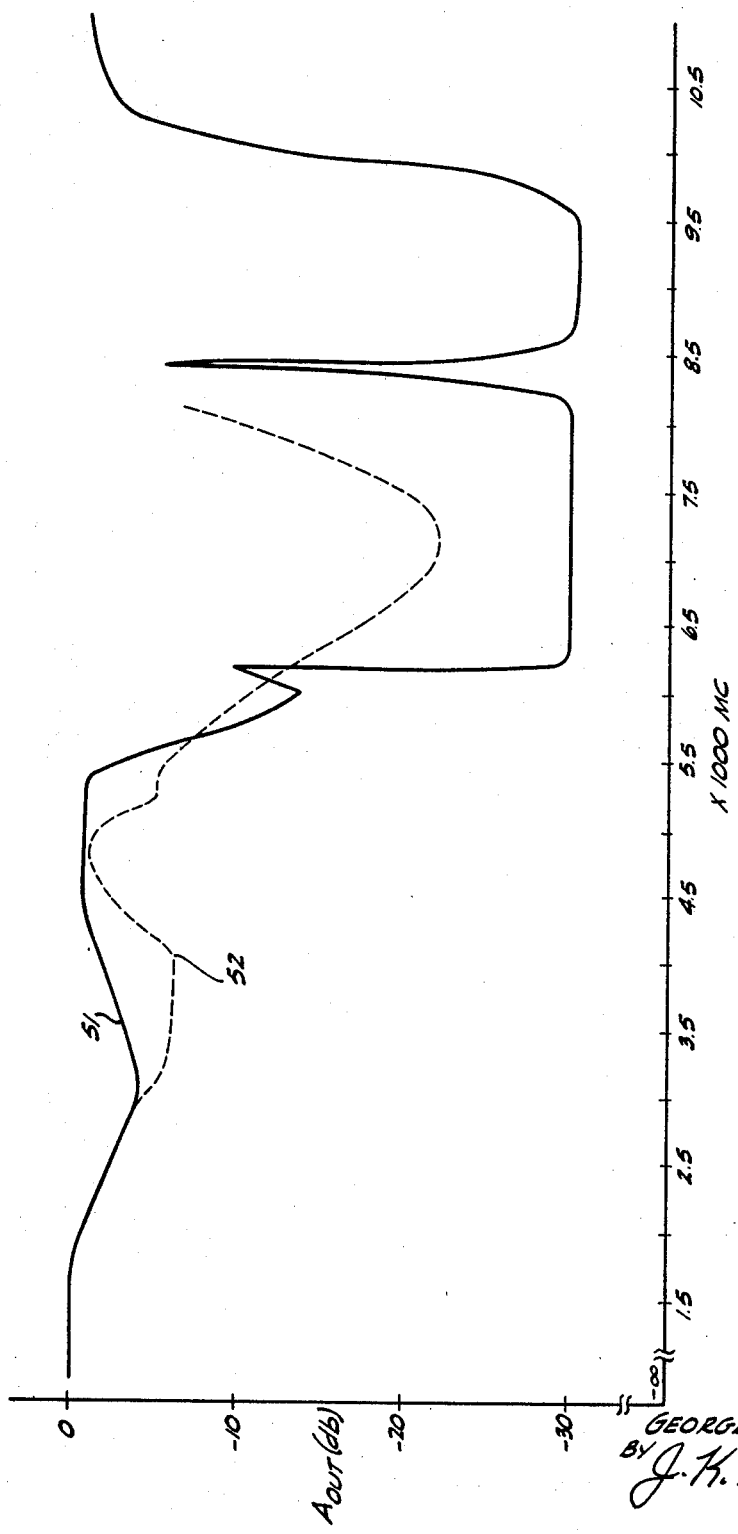

Feb. 24, 1970

G. I. TSUDA 3,497,835

MICROWAVE FILTER

Filed Dec. 10, 1965

INVENTOR.
GEORGE I. TSUDA,
BY J. K. Haskell
ATTORNEY.

United States Patent Office 3,497,835
Patented Feb. 24, 1970

3,497,835
MICROWAVE FILTER
George I. Tsuda, Fullerton, Calif., assignor to Hughes
Aircraft Company, Culver City, Calif., a corporation
of Delaware
Filed Dec. 10, 1965, Ser. No. 512,863
Int. Cl. H03h 7/10
U.S. Cl. 333—73                                    2 Claims The present invention relates to microwave circuitry and more particularly to improved microwave filters of the strip line or waveguide section type.

Conventional microwave filters often utilize low loss transmission lines along which are distributed either open or short circuited constant distributed elements known as stubs. The length of each of the stubs and the spacings therebetween are controlled so that the total impedance characteristic of the line as a function of the frequency of the energy propagating therethrough varies in accordance with the desired filtering action.

One type of presently known microwave filter is the strip line filter, in which a center strip of conductive material is generally spaced from outer conductive layers by thin layers of dielectric material, with the center strip having stubs of conductive material coupled thereto. Another type filter uses a main waveguide section as the low loss transmission line with the desired filtering characteristics being accomplished by waveguide stubs positioned therealong.

Conventionally, the stubs are placed symmetrically about the main filter transmission line about one side of the line with respect to its longitudinal axis. The technique of selecting the positions of the stubs along the main line so that the desired filtering action is achieved is often referred to as staggered tuning. This technique, as is appreciated by those familiar with the art, is quite complex, especially when the filtering requirements increase in complexity. Generally, the number of stubs and therefore the overall length of the main transmission line increase greatly with increased filtering complexity. For example, a filter characterized by a wide pass band, as well as a wide rejection band at specific center frequencies can only be constructed in the prior art with a large number of staggered stubs along a relatively long transmission line.

It is an object of the present invention to provide an improved microwave filter.

It is another object to provide a new microwave filter which is smaller than prior art filters with comparable filtering characteristics.

A further object is the provision of a novel microwave filter easily adaptable to provide preselected transmission characteristics.

Yet another object is to provide an improved microwave staggerly tuned filter with a main transmission line, capable of providing preselected transmission characteristics with a relatively large reject band and with a relatively large pass band.

Yet a further object is to provide an improved shunt type strip line filter having improved transmission line elements placed in a non-symmetrical manner relative to a main transmission line to provide a relatively large reject band and a desired pass band.

These and other objects of the invention are achieved by providing a filter with a main transmission line about which elements or stubs are distributed in a non-symmetrical manner, so that a smaller number of elements and/or a shorter transmission line are needed to provide preselected transmission characteristics. Whereas in the conventional filters, the elements are placed or staggered symmetrically about one side of the longitudinal axis of the transmission line, in accordance with the present invention, the elements are placed unsymmetrically about both sides of the axis. The lengths of the elements of each pair and their relative displacement along the longitudinal axis of the line are controlled to provide a modified element characteristic so that a smaller number of elements can be staggered along the line to provide the desired filtering action. The teachings of the invention are applicable to any filtering utilizing transmission line elements, such as strip lines, coaxial lines or waveguide sections. When utilizing waveguide sections in addition to controlling the frequency characteristics of the propagating energy higher order modes as well as the fundamental modes are controllable.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 4 is a graph of output amplitude versus frequency;

Figure 1:
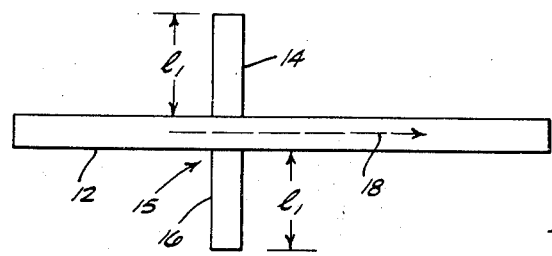
FIGURE 1 is a top cross-sectional view of a strip line filter arrangement.

Reference is now made to FIGURE 1 which is a simplified diagram of a transmission line 12 with a pair of displaced constant elements 14 and 16 placed about the line 12. The pair of elements is designated by the numeral 15. Assuming that arrow 18 represents the longitudinal axis of line 12, then as seen from FIGURE 1, elements 14 and 16 are placed on line 12 on either side thereof with respect to its longitudinal axis.

Figure 2:
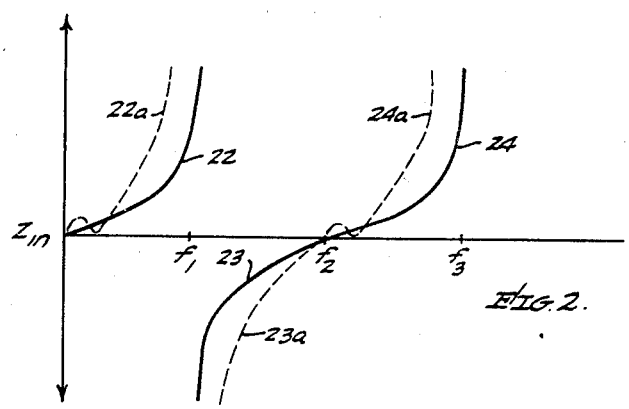
FIGURE 2 is a graph of input impedance $Z_{in}$ versus frequency of the input energy.

The input impedance $Z_{in}$ of the line 12 with the two elements 14 and 16 may be diagrammed with respect to the wavelength of the energy propagating therethrough as shown in FIGURE 2 to which reference is made herein. Since the line is assumed lossless, the input impedance comprises only of a reactive or imaginary component which is plotted along the ordinate, while the frequency $f$ is plotted along the abscissa.

Assuming that the impedance characteristics of line 12 is $Z_u$ and each of elements 14 and 16 of a length $l_1$ is $Z_1$, it is appreciated that the input impedance $Z_{in}$ of the line with the elements may be made to vary a function of frequency as indicated by solid lines 22, 23 and 24. As seen from FIGURE 2, at certain frequencies, such as $f_1$ and $f_3$, $Z_{in}$ approaches infinity, representing a rejection band while at other frequencies, such as $f_2$, $Z_{in}$ is substantially zero, representing a pass band.

Figure 3:
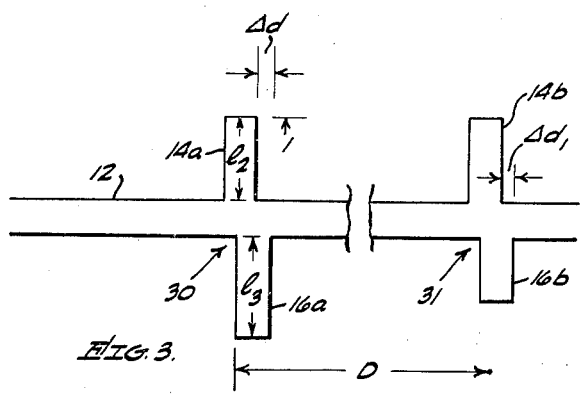
FIGURE 3 is a top cross-sectional view of a strip line filter arrangement of the present invention.

In accordance with the teachings of the present invention, the input impedance $Z_{in}$ as a function of frequency can be modified by controlling the relative displacement between the two elements 14 and 16 in the direction of the longitudinal axis of the transmission line 12 as well as controlling their relative lengths and characteristic impedances with respect to one another. For example, as seen in FIGURE 3 to which reference is made herein, by offsetting elements 14a and 16a, comprising element pair 30 by an amount Δd along the longitudinal axis of line 12 and by controlling their lengths to be $l_2$ and $l_3$ respectively, the input impedance $Z_{in}$ versus frequency can be modified, as indicated for explanatory purposes by dashed lines 22a, 23a and 24a. The offset distance Δd preferably does not exceed the width of either of the elements, so that the maximum offset may equal the width of the narrower of the two.

Since the slopes of lines 22a and 23a are greater than the slopes of lines 22 and 23, it is appreciated that the rejection band about $f_1$ as a center frequency is increased. Also the slopes of line 23a and in particular line 24a indicate that the pass band about $t_2$ is affected with the center of the pass band shifting from $f_2$. However, by utilizing additional pairs of elements such as pair 31 consisting of elements 14b and 16b which may also be displaced with respect to one another by a distance $\Delta d_1$ and staggered along the line 12, the pass band width can be controlled to conform to desired transmission characteristics. The staggering of the pairs of elements along line 12 and the number of pairs required is a function of the required width of the pass band and the particular cutoff requirements. The distance D between pairs of elements is made approximately equal to an integer number of quarter wavelength of the pass band center frequency. Also the relative lengths of the various elements is controlled to control the characteristics of the rejection band.

It has been found that by employing the novel teachings herebefore described whereby elements are placed in pairs about a main line with the elements of each pair being displaced or offset along the longitudinal axis of the line, the input impedance of the line can be modified with a higher degree of flexibility than in the conventional arrangements of prior art filters. Also a smaller number of elements is generally required. In addition, since the elements are staggered on either side of the main line, the total length of the line is greatly reduced, thus resulting in a smaller filter requiring less space which is most significant in various applications, particularly in space exploration. For example, to control the rejection band with open elements or stubs the elements of each pair are chosen to be substantially odd integers of quarter wavelength of the center frequency of the rejection band and the offset between the elements such as Δd (FIGURE 3) chosen to control the width of the rejection band. On the other hand the spacing such as D (FIGURE 3) between elements is controlled to be substantially integers of odd multiples of X/4 of the center frequency of the desired pass band.

As is appreciated by those familiar with the art with open circuit stubs the pass band may be controlled by controlling the length of the shunt type (the outer and inner conductors are not broken) stubs to be integers of even multiples or quarter wavelength of the center frequency of the desired pass band. Also for open circuited stubs the reject band is controlled by controlling the lengths of the shunt stubs to be odd multiples of a quarter wave length of the center frequency of the reject band. On the other hand with short circuited shunt stubs, stub lengths which are integers of odd or of even multiples of a quarter wavelength may be used to control the pass band and rejection band respectively.

Figure 6:
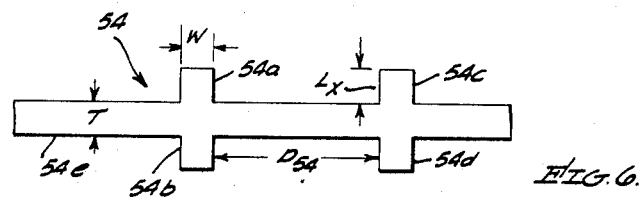
FIGURE 6 is a top cross-sectional view of a strip line filter arrangement with symmetrical elements.
Figure 5:
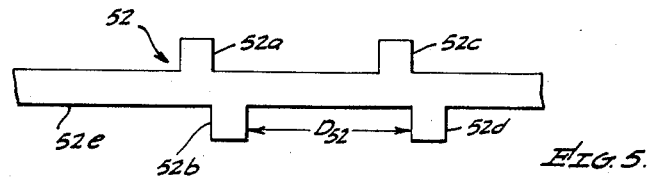
FIGURE 5 is a top cross-sectional view of another strip line filter arrangement constructed in accordance with the present invention.

The advantages realizable by practicing the teachings of the present invention may be exemplified by referring to FIGURE 4 which is a diagram in which the amplitude of the output signal $A_{OUT}$ is plotted in db as a function of frequency and FIGURES 5 and 6 which are views of two strip line filters which were reduced to practice in accordance with the teachings of the present invention. The filters were designed for a rejection band with a center frequency of 7365 mc. In FIGURE 4 the solid line 51 represents the amplitude to frequency response of the filter 52 of FIGURE 5, while the dashed line 53 represents the response of filter 54 in FIGURE 6. As seen from FIGURES 5 and 6 filters 52 and 54 include four stubs 52a through 52d and 54a through 54d, respectively staggered along respective main lines or structure 52e and 54e. The stubs of each filter were of equal width W and length L and the main line was of equal thickness T. W, L and T equalled 0.198 inch, 0.210 inch and 0.198 inch respectively. The spacing between elements in filter 52, designated $D_{52}$ equalled 0.845 inch, while the spacing $D_{54}$ in filter 54 was 1.043 inches.

The major feature which distinguishes the two filters from one another is the fact that in filter 52 the two stubs of each pair are offset along the longitudinal axis of line 52e, while in filter 54 the stubs of each pair are symmetrically positioned with respect to the main line 54e. The effect of offsetting the stubs, as is the case in filter 52 becomes apparent from FIGURE 4 wherein it is seen that except for a narrow transmission band about 8400 mc. filter 52 provides a broad rejection band between 6250 mc. to about 9700 mc. The output signal at the designated frequency of 7365 mc. is at least −30 db. On the other hand filter 54 with the symmetrical stubs provides a relatively narrow rejection band, and even at the designated frequency the output signal is only −22 db below the input signal. Also in filter 52, by controlling $D_{52}$ to be substantially an integer number of a quarter wavelength of a frequency in the pass band the pass band characteristics can be controlled. As seen from FIGURE 4 in the frequency range between 3000 mc. and 5500 mc. the attenuation of the output signal is considerably less than that realizable with filter 54.

From the foregoing it should thus be appreciated that the offsetting of the stubs of the stubs of each pair provides an important variable for controlling the transmission characteristics of the filter so that fewer stubs are needed and therefore a shorter line can be utilized. Furthermore, by controlling the spacing between pairs the transmission characteristics of the pass band are controllable. The filter's transmission characteristics can further be controlled by varying the length of the two stubs of one or of the pairs. This is diagrammed in FIGURE 3 in which stubs 14a and 16a of pair 30 are shown to be of lengths $l_2$ and $l_3$ respectively.

Figure 7:
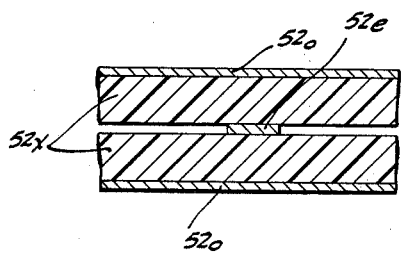
FIGURE 7 is a side view of a strip line filter arrangement.

Reference is now made to FIGURE 7 which is a side view of a strip line filter such as filter 52 (FIGURE 5) in which the main line 52e is shown spaced from an exterior conductive layer $52_o$ by two layers of insulative dielectric matter $52_x$. The techniques of constructing strip line filters are known in the art.

Although in the foregoing description the invention has been described in conjunction with strip line arrangements, the teachings of the invention are not limited thereto. Rather they are applicable to any filtering arrangement which includes a main transmission line or structure with distributed elements. It is applicable to arrangements with constant characteristic impedance such as coaxial lines, strip lines of conductive material, as well as elements with varying characteristics such as waveguide sections. When using a waveguide arrangement or structure, an additional variable is obtained in that higher order modes may be controlled in addition to the fundamental modes. An example of the use of waveguide sections in accordance with the teachings of the present invention will be described and shown hereafter in detail.

Figure 8:
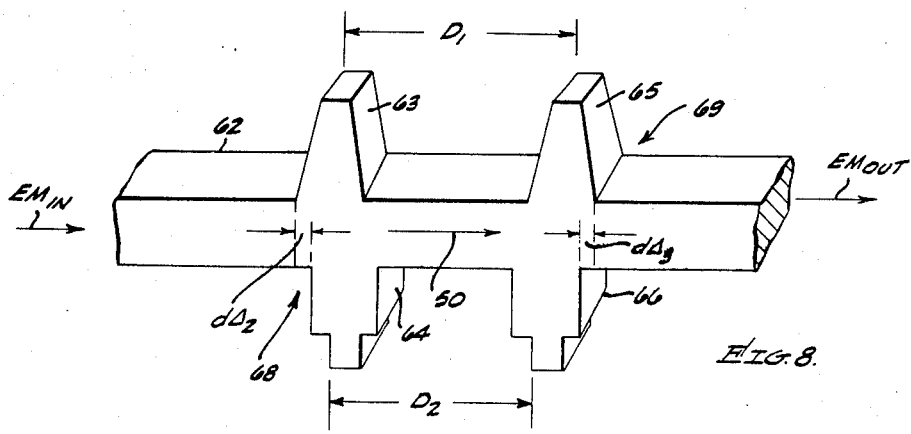
FIGURE 8 is another embodiment of the invention employing waveguide sections.

Reference is now made to FIGURE 8 which is an isometric view of another embodiment of a filter constructed in accordance with the teachings of the invention in which the main transmission line is a main waveguide section 62 having a cross-section which is selected so that only certain fundamental modes of electromagnetic energy and particular higher order modes above a certain cut off frequency are transmittable through the main section or structure 62. To structure 62 ae coupled waveguide sections 63–66, sections 63 and 64 comprising a first pair 68 and sections 65 and 66 comprising a second pair 69. As seen from FIGURE 8, sections 63 and 65 are offset by distances $d\Delta_2$ and $d\Delta_3$ with respect to sections 64 and 66 respectively along the longitudinal axis of the main waveguide structure 42, designated by arrow 50. The distances between sections 63 and 65 and 64 and 66 are designated by $D_1$ and $D_2$ respectively.

As is appreciated by those familiar with the art of microwaves, the cross-sections of the sections 63–66 may be chosen in relation to the cross-section of section 62 so that in response to electromagnetic energy entering section 62, as indicated by the arrow marked $EM_{IN}$, the fundamental and higher order modes of electromagnetic energy transmittable through the various sections are controlled, so that only energy of preselected modes exit the structure, as indicated by arrow $EM_{OUT}$. Furthermore, the rate at which the electromagnetic energy is affected may be controlled by the shapes of the various sections. As seen from FIGURE 8, sections 63 and 65 are tapered to provide a gradual cutoff, while sections 64 and 66 are stepped elements so that the cutoff is abrupt at the point of cross-section changes. It should be appreciated that waveguide sections with different cross-sections may be selected to provide any desired cutoff characteristic.

While the shapes of the various waveguide sections are used to control the modes transmittable through the filter, the spacings therebetween as well as the offsets between elements can be employed as herebefore described to control the overall pass and rejection transmission characteristics of the filter. It should be noted that in FIGURE 8 the elements are staggered in both directions. Thus the dimension $D_1$ is greater than the dimension $D_2$.

Although in the foregoing description the teachings of the invention were described in conjunction with one or two pairs of elements, it is appreciated that any number of pairs of elements can be employed depending on the desired filter's transmission characteristics.

There has accordingly been shown and described herein a novel filter in which one or more pairs of elements are staggerly distributed along the main transmission line or structure with the elements of each pair being offset along the longitudinal axis of the line. It is appreciated that in light of the foregoing description those familiar in the art may make modifications or substitute equivalents without departing from the true spirit of the invention. Therefore all such modifications and equivalents are deemed to fall within the scope of the invention as claimed in the appended claims.

What is claimed is:
1. A filter comprising
a waveguide section having a longitudinal axis and of a cross-section selected to inhibit a selected frequency band of electromagnetic energy, and
a plurality of pairs of waveguide section elements, each pair coupled to said waveguide section on opposite sides thereof, each pair of elements being offset from one another along the longitudinal axis by a predetermined distance less than the width of either of said elements, one element of each pair having a stepped configuration at the end thereof to provide a substantially abrupt frequency cut-off characteristic, selected ones of the elements having lengths to be an even multiple of the quarter wave length of the center frequency of the pass band and selected ones of the elements having lengths which are an odd multiple of the center frequency of the desired reject band.

2. A filter comprising
a waveguide section having a longitudinal axis and of a cross-section selected to inhibit a selected frequency band of electromagnetic energy,
and a plurality of pairs of waveguide section elements, each coupled to said waveguide section on opposite sides thereof, each pair of elements being offset from one another along the longitudinal axis by a predetermined distance less than the width of either of said elements, each of said pairs of elements having one element of a stepped configuration and the other element of a tapered configuration to provide a substantially abrupt frequency cut-off characteristic, selected ones of the elements having lengths to be an even multiple of the quarter wave length of the center frequency of the pass band or an odd multiple of the center frequency of the desired reject band.

References Cited

UNITED STATES PATENTS

| | | | |
|---|---|---|---|
| 2,964,718 | 12/1960 | Packard. | |
| 2,819,452 | 1/1958 | Arditi et al. | |
| 2,984,802 | 5/1961 | Dyer. | |
| 3,343,069 | 9/1967 | Tsuda | 321—69 |
| 3,345,589 | 10/1967 | Di Piazza | 333—73 |

ELI LIEBERMAN, Primary Examiner

C. BARAFF, Assistant Examiner

U.S. Cl. X.R.

333—84